Aug. 26, 1941. C. L. JOHNSON Re. 21,886

INTERNAL COMBUSTION ENGINE

Original Filed Aug. 13, 1936 3 Sheets-Sheet 1

INVENTOR.
Clarence L. Johnson
BY
Kent W. Worrell
ATTORNEY.

INTERNAL COMBUSTION ENGINE

Original Filed Aug. 13, 1936 3 Sheets-Sheet 2

INVENTOR.
Clarence L. Johnson

BY Kent W. Worrell
ATTORNEY.

Aug. 26, 1941. C. L. JOHNSON Re. 21,886

INTERNAL COMBUSTION ENGINE

Original Filed Aug. 13, 1936 3 Sheets-Sheet 3

INVENTOR.
Clarence L. Johnson

BY Kurt W. Wonnell
ATTORNEY.

Reissued Aug. 26, 1941 Re. 21,886

UNITED STATES PATENT OFFICE 21,886

INTERNAL COMBUSTION ENGINE

Clarence L. Johnson, Waukegan, Ill., assignor to Johnson Brothers Engineering Corporation, Waukegan, Ill., a corporation of Indiana Original No. 2,118,761, dated May 24, 1938, Serial No. 95,869, August 13, 1936. Application for reissue April 9, 1941, Serial No. 387,727

26 Claims. (Cl. 123—59)

This invention relates in general to internal combustion engines and has more particular reference to the variation of the fuel supply for low speed and higher speeds.

An important object of the invention is in the provision of novel means for supplying a combustible mixture to a fixed minimum passage and to vary the mixture in another passage for higher speeds and higher power.

A further object of the invention is to simplify the fuel supply structure of an engine by utilizing the engine piston and the engine fuel admission valves as a fuel controller.

A still further object of the invention is to improve the fuel economy and volumetric efficiency of a two-cycle engine at idling or low speed and at higher speeds.

Other objects of the invention will appear hereinafter, the accompanying drawings illustrating preferred embodiments of the invention in which Fig. 1 is a sectional view of a two cycle engine of the crank case compression type to which this invention is applied;

In carrying out this invention a minimum fuel passage is provided for admitting fuel directly to the crank case of a two-cycle internal combustion engine for operating it at slow speed and low or no power, such as when the engine is idling. For higher speed and higher power a fuel admission passage is provided which has a valve for the variable operation of the engine, the admission of fuel being in addition to the fuel admitted by the minimum passage and to the same or a different part of the compression chamber. For example, in the structure shown in Figs. 1 and 2 the minimum passage opens directly into the cylinder portion of the compression chamber and is controlled by the skirt of the piston while the larger passage admits fuel through a rotary valve to the crank case compression chambers for the cylinders; in the structure shown in Figs. 4 to 7 the minimum passage and the variable passage both open into the lower portion of the crank case; and in the structure shown by Figs. 8, 9 and 10 there is a single fuel jet at the division between the minimum and variable passages, the former controlled by the rotary valve in the crank case and the latter by the piston in the cylinder. Though in Figures 8, 9 and 10 only a single fuel jet is illustrated, it will be understood, of course, that if preferred a separate jet may be used for each passage.

Figure 1:
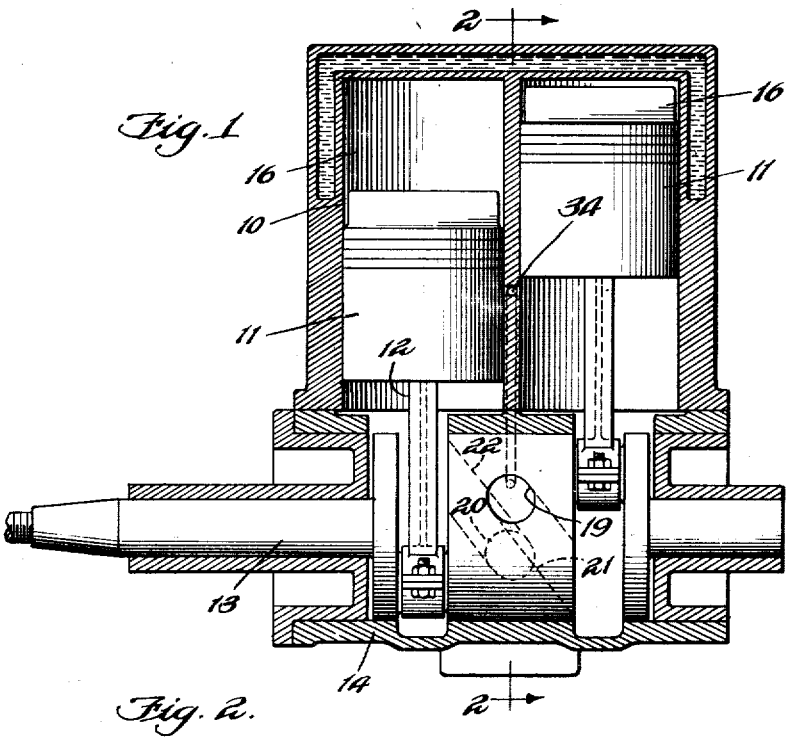
Figure 2:
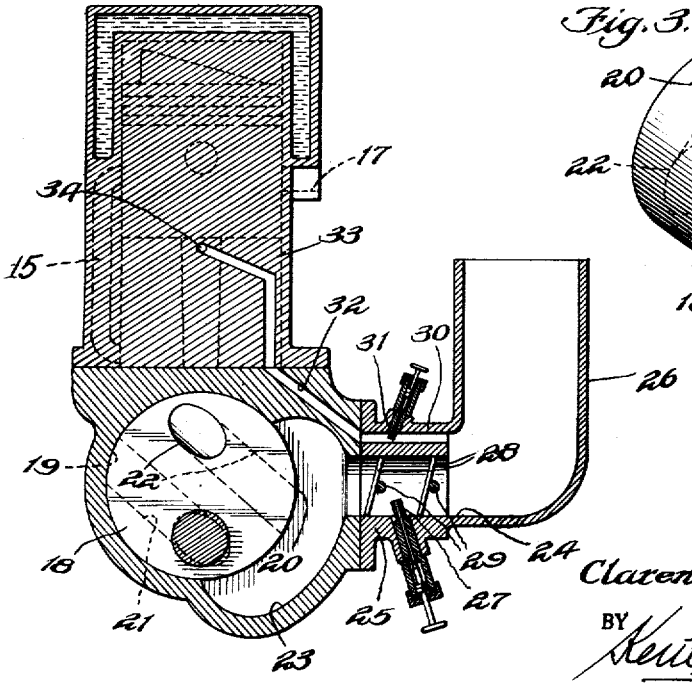
Fig. 2 is a transverse section taken on the line 2—2 of Fig. 1.
Figure 3:
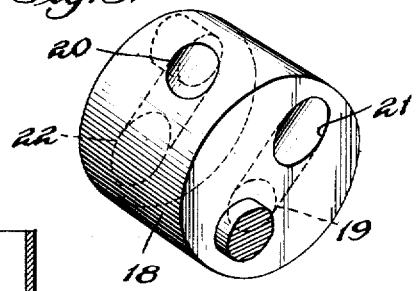
Fig. 3 is a perspective of the rotary valve part.
Figure 4:
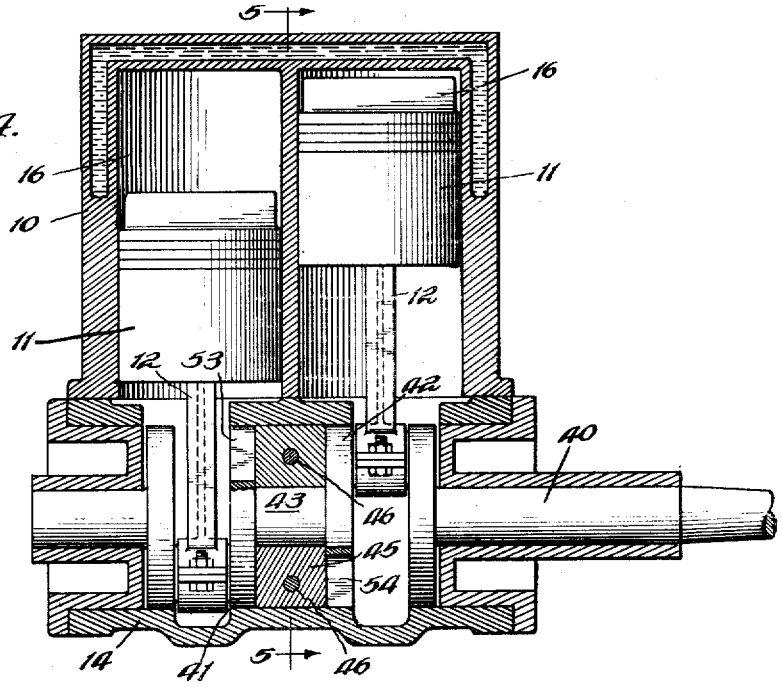
Fig. 4 is a sectional view of a modification in which the minimum and variable fuel passages both communicate with the crank case.

Referring now more particularly to the drawings, a two-cycle engine is shown in Figs. 1 and 2 having a pair of cylinders 10 in each of which is a piston 11 connected by means of a piston rod 12 to a crank shaft 13. The crank shaft is mounted in the crank casing 14 secured to the open end of the cylinders and a bypass 15 is provided in the cylinder wall of each cylinder for conducting a compressed fuel charge from the crank case compression chamber around the piston to an explosion chamber 16 at the outer end of the cylinder. At one side of each cylinder is an exhaust outlet 17 through which the products of combustion are discharged when the piston is at the lower end of its stroke, thereby uncovering the upper end of the bypass 15 for the inlet of a new fuel charge and allowing the escape of the burned gases through the exhaust discharge 17. This construction may be embodied in a single cylinder engine of the three port type or in a multi-cylinder type where the operation is the same.

Mounted on the crank shaft is a rotary valve 18 which may also act as a bearing but for a two cylinder engine as shown in Fig. 1 it has peripheral inlets 19 and 20 spaced about 180° apart and opposite angular passages 21 and 22 respectively leading to the crank case chambers at opposite sides thereof.

At one side of the rotary valve in the crank case is a fuel admission recess 23 (Fig. 2) extending over a portion of the periphery of the rotary valve 18 in line with the openings 19 and 20 thereof and communicating with this recess is a fuel admission passage 24 in a fitting 25 which has a connected tubing 26 which constitutes an air admission inlet for the engine. Extending into the passage 24 is a fuel admission nozzle 27 located adjacent to or between throttle valves 28, each mounted on an intermediate pivot 29 operable from the outside of the fitting 25. Of these throttle valves 28, the one disposed toward the left as the parts are viewed in Figure 2 is a throttle valve and the one disposed toward the right is a choke.

Also extending through the fitting 25 from the air tube 26 is a minimum fuel admission passage 30 with a fuel nozzle 31 projecting into the passage and receiving fuel from a suitable source of supply. The discharge of this nozzle 31 as well as that of the nozzle 27 are commonly controlled by needle valves for accurately varying the amount of the fuel. This pasage 30 communicates with a passage 32 in the wall of the crank case and the latter passage connects with a passage 33 in the cylinder block between the cylinders terminating in an opening 34 communicating with the upper portions of the compression chambers of both cylinders.

With this construction the operation is that the minimum passage between the cylinders is always open and the fuel adjustment is such that the engine will operate at idling or low speed even when the valves 28 are closed. The admission of fuel through the minimum passage is controlled by the skirts or lower edges of the pistons 11 which thereupon act as valves for admitting the fuel directly to the compression chamber near the outer end of the compression stroke of the piston, the fuel being drawn into the compression chamber by suction. For higher speed and more power the valves 28 are opened and then in addition to the passage of fuel through the minimum opening, fuel is drawn through the rotary valve 18 into the respective crank cases as the engine is operated. There the ordinary partial compression takes place and at the proper time the fuel in each crank case passes through the bypass 15 to the compression chamber for that cylinder. Thus the controlled fuel inlet is added to the minimum fuel inlet for speed and power and if the control fuel inlet is entirely closed the engine will continue to operate at idling or low speed in accordance with the setting of the minimum fuel inlet.

Figure 5:
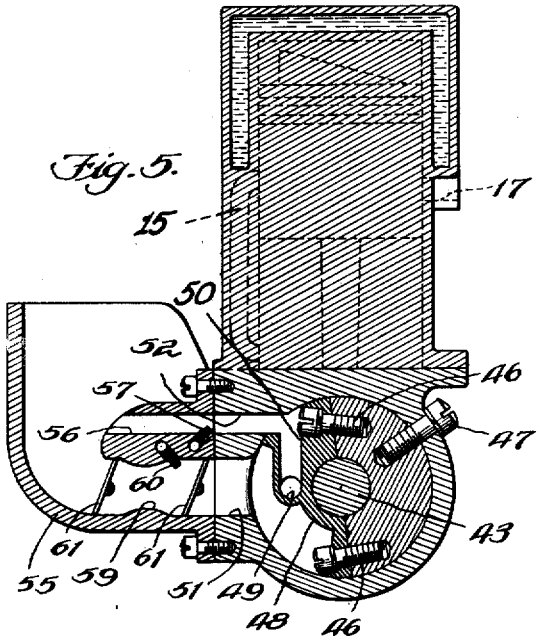
Fig. 5 is a section taken on the line 5—5 of Fig. 4.
Figure 6:
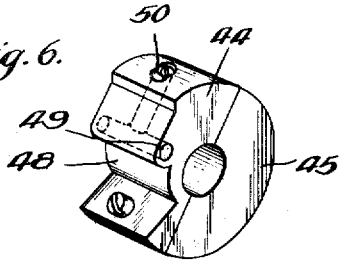
Fig. 6 is a perspective of a fixed fuel admission device.
Figure 7:
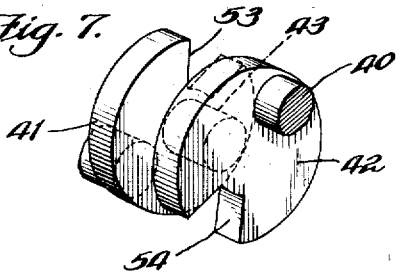
Fig. 7 is a perspective of the rotary fuel admission at the sides of the fixed device.

Referring now more particularly to Figs. 4 to 7, both the minimum and the high speed inlets are connected to the crank case of each individual cylinder. For accomplishing this result a crank shaft 40 is mounted in an engine similar to that shown in Fig. 1 but has central valve discs 41 and 42 connected by a short shaft section 43 mounted upon which is a stationary inlet connection composed of two parts 44 and 45 secured together by set screws 46 and held in fixed relation by a set screw 47 extending through the crank case into one of the parts as shown in Fig. 5. This inlet connection also constitutes a central crank case bearing and a partition separating the crank case chambers for the cylinders and it is made in two parts so that it may easily be applied to the shaft portion 43.

One of the valve parts 44 has a recess 48 extending to both sides and adjacent thereto is a transverse bore 49 also opening at both sides of the member and having an angular extension 50 opening at the periphery of this member.

At one side of the crank case and communicating with the recess 48 of the valve member is a large fuel admission passage 51 and a smaller admission passage 52 which communicates with the extremity of the passage 50.

In the periphery of each of the valve discs 41 and 42 are segmental recesses 53 and 54 respectively adapted to open the recess 48 and the extremity of bore 49 to either one of the compression chambers at the sides of the valve member as the crank shaft is rotated.

To supply fuel to the passages 51 and 52 a fuel fitting 55 is attached at the side of the crank case having a minimum passage 56 with a fuel admission nozzle 57 therein communicating with the passage 52 and a high speed passage 59 communicating with the passage 51 in the crank case. Projecting into the passage 59 is a high speed fuel nozzle 60 and at either or both sides of this nozzle are valves 61 operated as desired from the outside of the fitting for regulating and controlling the speed and power. Of these valves 61 the one disposed to the right as the parts are viewed in Figure 5 is a throttle valve and the one disposed to the left is a choke.

With this construction the engine will receive a minimum supply of fuel through the passages 56, 52, valve passages 50 and 49 to either crank case chamber of the engine through the openings in the valve discs 41 and 42 as the crank shaft is rotated.

If higher speed or more power is desired the valves 61 are opened and additional fuel is supplied through the passages 59, 51, the valve recess 48, and the openings in the valve discs 41 and 42.

Figure 8:
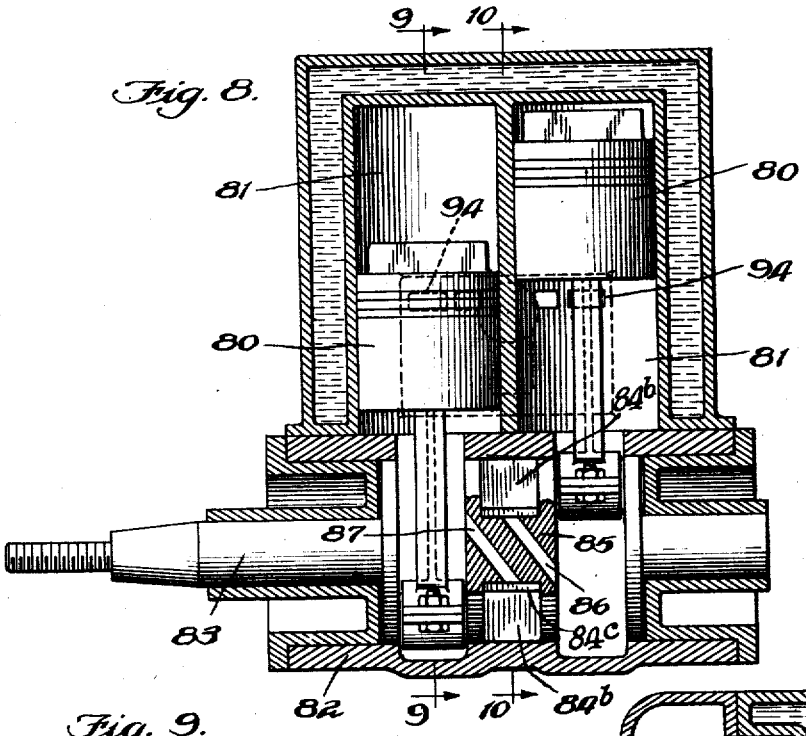
Fig. 8 is a sectional view of a form of the invention in which the minimum passage is through the rotary valve to the crank case and the variable passage is in the cylinder controlled by the piston.
Figure 9:
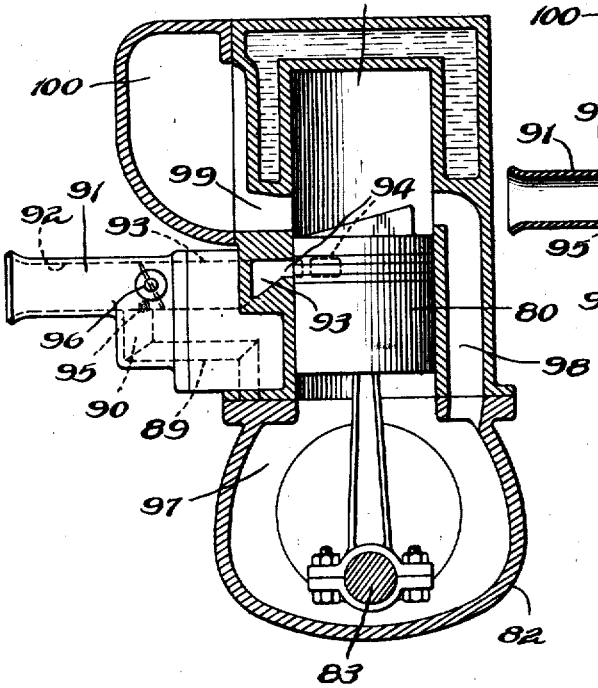
Fig. 9 is a section taken on the line 9—9 of Fig. 8.
Figure 10:
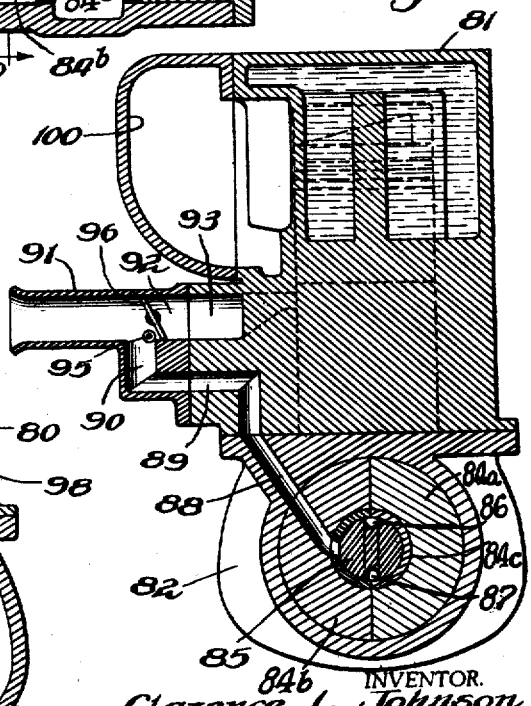
Fig. 10 is a section taken on the line 10—10 of Fig. 8.

In the construction shown by Figs. 8, 9 and 10, a double cylinder engine of the two-cycle type has pistons 80 movable in cylinders 81, and attached crank case 82, in which a crank shaft 83 is rotatable. Between the cylinders the crank case is provided with a split partition formed of the members 84*a* and 84*b* which surround a split bearing 84*c* for receiving a rotary valve 85 having oppositely extending passages 86 and 87 for distributing gas from a passage 88 terminating at the periphery of the rotary valve. The bearing 84*c* is provided with an aperture registering with the passage 88. This passage 88 communicates with a connected passage 89 in the cylinder block at one side of the cylinders, and this passage communicates in turn with a fuel passage 90 in a fitting 91 having a larger passage 92 connected by means of a passage 93 and ports 94 through the adjacent cylinder wall which are uncovered by the pistons 80 at the upper end of their strokes.

In the fitting at the point of divergence or separation of the passages 90 and 92 is a single fuel jet 95 for controlling the admission of fuel in any well known manner, and adjacent the jet 95 in the larger passage 92 is a variable valve 96 for controlling and varying the supply of fuel through the larger passage and through the ports 94.

With this construction a single fuel jet is used for supplying fuel either to the minimum supply passage which leads through the rotary valve directly to the crank case chambers for the two cylinders, and it also supplies fuel to the variable passage which is controlled by the pistons acting as valves. After the mixture is admitted to either crank case chamber 97 passes through a bypass 98 to the explosion end of the cylinder and is discharged from an exhaust passage 99 into a muffler or discharge fitting 100 in a well known manner. As indicated above, it will be understood that instead of a single fuel jet for the two passages 90 and 92, a fuel jet may be provided for each passage, as shown in Figures 1 to 7.

In all of these forms the fuel is admitted to the compression chamber in the crank case and below the piston either through a minimum passage or through both a minimum and a variable passage and the compressed charge is admitted to the explosion chamber around the piston through a bypass controlled by the piston. In all forms there is a fixed minimum supply of fuel for low or idling operation of the engine and a variable and adjustable valve control for a larger or high speed fuel passage which is added to the minimum fuel passage but is variable for controlling the speed and power. Moreover, in all forms of the invention hereinabove described the distribution of the combustible mixture from either the minimum speed passageway or the controllable passageway is controlled in response to rotation of the crank shaft. As shown, a single fuel jet for both passages or an individual fuel jet for each passage may be employed and either of these forms may be combined with a two port and a three port operation of an ordinary two-stroke cycle internal combustion engine.

It is customary to designate a two-stroke cycle internal combustion engine as of the three port type or the two port type, depending, respectively, upon whether the fuel admission to the crank case is controlled by the piston or whether it is controlled by another and separate valve means. In the present case it will be apparent that there are both two port and three fort fuel passages, and in one of the forms both the minimum and the variable passage are of the same type.

I claim:

1. In a two cycle engine, a pair of engine cylinders, a crank shaft enclosing chamber for each of said cylinders, a crank shaft enclosed within said crank shaft enclosing chamber, a rotary valve connected with said crank shaft, said rotary valve being positioned between said chambers and forming a distributor for the opposite compression chambers, means for supplying a fixed amount of fuel to the compression chambers, and means for supplying a variable amount of fuel through the rotary valve to the compression chambers.

2. In an internal combustion engine, a crank case mixture receiving chamber, means comprising a plurality of fuel mixture passages to said chamber, one passage supplying an unvaried amount of fuel mixture for low engine power, means in the other passage for varying the fuel mixture supply for greater engine power, a fixed valve member having passages communicating with the fixed fuel mixture and variable fuel mixture passages, and rotary valve means operated by the engine for admitting fuel mixture to said mixture receiving chamber from the fixed fuel mixture passage at all times and from the variable fuel mixture passage in addition thereto.

3. In an internal combustion engine, a pair of adjacent engine cylinders having connected crank case chambers, a crank shaft extending through the crank case having a pair of disc valves with opposite valve recesses therein, a fixed valve member between the said discs having a peripheral inlet extending to both sides and a segmental recess also extending to both sides and adapted to be opened and closed by the valve discs, means for supplying an unvaried fuel mixture to the peripheral recess of the fixed valve member, and means for varying the fuel mixture supplied to the segmental recess, the mixtures being admitted alternately to the crank case compression chambers, and means controlled by the pistons in the cylinders for admitting the fuel mixtures to the engine compression chambers.

4. In a two cycle internal combustion engine having a crank case compression chamber and an explosion chamber, means forming a three port adjustable fuel admission passage and a two port fixed fuel admission passage into said compression chamber, said passages having a common inlet, and a single fuel feeding jet at the point of divergence of the two passages from the common inlet whereby fuel may be fed to the fixed passage and to both passages for supplying fuel to the engine.

5. An internal combustion engine comprising, in combination, a plurality of cylinders, pistons within said cylinders, crank shaft enclosure means, means for dividing said enclosure means into a plurality of compartments corresponding to and communicating with said cylinders, means controlled by said pistons for providing communication between said compartments and the explosion ends of said cylinder, a crank shaft within said enclosure means, means providing a non-throttleable passageway for a combustible mixture for said cylinders for idling conditions, means responsive to rotation of said crank shaft for controlling the connection of said idling speed passageway successively to said compartments, means providing a passageway to each of said cylinders for supplying combustible mixture to said cylinders for higher speed conditions, and control means for said last mentioned means.

6. In an internal combustion engine, a plurality of cylinders, pistons within said cylinders, crank shaft enclosure means, means dividing said enclosure means into compartments corresponding to and communicating with said cylinders, means controlled by said pistons for providing communication between said compartments and the explosion ends of said cylinders, a crank shaft within said enclosure means, means providing a passageway for a non-varying flow of combustible mixture to said cylinders for idling conditions, means providing a passageway for combustible mixture for said cylinders for higher speed conditions, throttle means for said last mentioned means, and means responsive to rotation of said crank shaft for controlling the distribution selectably to said compartments of the combustible mixture in one of said passageway providing means.

7. An internal combustion engine comprising, in combination, a plurality of cylinders, pistons within said cylinders, crank shaft enclosure means, means for dividing said enclosure means into a plurality of compartments corresponding to and communicating with said cylinders, means controlled by said pistons for providing communication between said compartments and the explosion ends of said cylinders, a crank shaft within said enclosure means, means providing non-throttleable passageways for combustible mixture for said cylinders for idling conditions, means providing passageways to said cylinders for supplying combustible mixture to said cylinders through said compartments for higher speed conditions, throttle means for said last mentioned means, and means responsive to rotation of said crank shaft for controlling the distribution of combustible mixture selectively to said compartments.

8. An internal combustion engine comprising, in combination, a plurality of cylinders, pistons within said cylinders, crank shaft enclosure means, means dividing said enclosure means into compartments corresponding to and communicating with said cylinders, means controlled by said pistons for providing communication between said compartments and the explosion ends of said cylinders, a crank shaft within said enclosure means, said engine being provided with a non-throttleable passageway for delivering combustible mixture for idling conditions, said engine also having another passageway for supplying combustible mixture for higher speed conditions, throttle means for said last mentioned passageway, and means responsive to rotation of said crank shaft for controlling the distribution of combustible mixture from both of said passageways selectively to said compartments.

9. An internal combustion engine comprising, in combination, a plurality of cylinders, pistons within said cylinders, crank shaft enclosure means, means dividing said enclosure means into compartments corresponding to and communicating with said cylinders, means controlled by said pistons for providing communication between said compartments and the explosion ends of said cylinders, a crank shaft within said enclosure means, said engine being provided with a non-throttleable passageway for delivering combustible mixture for idling conditions, said engine also having another passageway for supplying combustible mixture for higher speed conditions, throttle means for said last mentioned passageway, and means responsive to rotation of said crank shaft for controlling the distribution of combustible mixture from one of said passageways selectively to said compartments.

10. An internal combustion engine comprising, in combination, a plurality of cylinders, pistons within said cylinders, crank shaft enclosure means, means dividing said enclosure means into compartments corresponding to and communicating with said cylinders, means controlled by said pistons for providing communication between said compartments and the explosion ends of said cylinders, a crank shaft within said enclosure means, said engine being provided with a passageway for delivering combustible mixture to said cylinders for open throttle conditions, means for throttling the flow of combustible mixture through said passageway, said engine being provided with non-throttleable passageways for delivering combustible mixture for idling conditions, and means responsive to rotation of said crank shaft for controlling the distribution of combustible gas from said last mentioned passageway to said compartments.

11. An internal combustion engine comprising, in combination, a plurality of cylinders, pistons within said cylinders, crank shaft enclosure means, means dividing said enclosure means into compartments corresponding to and communicating with said cylinders, means controlled by said pistons for providing communication between said compartments and the explosion ends of said cylinders, a crank shaft within said enclosure means, said engine being provided with a passageway for delivering combustible mixture thereto for open throttle conditions, said engine being provided with a non-throttleable passageway for delivering gas thereto for idling conditions, means for throttling the flow of gas delivered through said first mentioned passageway, and means responsive to the rotation of said crank shaft for controlling the distribution through said second mentioned passageway selectably to said compartments.

12. In an internal combustion engine, in combination, a crank case chamber, a crank shaft in said chamber, means dividing said chamber into a plurality of compartments, said dividing means including a fixed valve member having passages therethrough communicating with said compartments, and rotary valve means operating in synchronism with said crank shaft for selectably admitting fuel through said passageways to said compartments, said engine including a pair of conduits for conducting combustible mixture to said fixed valve member, one of said conduits being non-throttleable, the other of said conduits being controllable independently of said first-mentioned conduit.

13. In an internal combustion engine, in combination, crank shaft enclosure means, a crank shaft in said enclosure means, means dividing said enclosure means into a plurality of compartments, said dividing means including a fixed valve member having passages therethrough communicating with said compartments, and rotary valve means operating in synchronism with said crank shaft for selectably admitting fuel through said passageways to said compartments, said engine being provided with a plurality of passageways communicating with said fixed valve member, one of said passageways being adapted to admit a non-varying supply of fuel for idling conditions, the other adapted to admit fuel for higher speed conditions, and throttle means for controlling the flow of fuel through said last mentioned passageway.

14. An internal combustion engine comprising, in combination, a plurality of cylinders, pistons within said cylinders, crank shaft enclosure means, said enclosure means comprising a plurality of compression compartments corresponding to and communicating with said cylinders, means controlled by said pistons for providing communication between said compartments and the explosion ends of said cylinders, a crank shaft within said enclosure means, means providing a non-throttleable passageway for a combustible mixture for said compartments for idling conditions, means responsive to rotation of said crank shaft for controlling the connection of said idling passageway successively to said compartments, means providing a passageway to each of said compression compartments for supplying combustible mixture to said compartments for higher speed conditions, and control means for said last mentioned means.

15. In an internal combustion engine, in combination, crank shaft enclosure means comprising a combustible mixture receiving chamber, a reciprocable piston, a crank shaft within said chamber, said piston being connected with said crank shaft and being adapted to control communication between said chamber and the explosion chamber of said engine, said receiving chamber and the explosion chamber having connection with one another through a by-pass controlled by said piston, a non-regulatable passage for supplying combustible mixture to said chamber for minimum engine running requirements, another passage for supplying combustible mixture to said chamber for higher speed running conditions, said second mentioned passage having means therein for varying the flow of mixture therethrough, the connection of one of said passages with said mixture receiving chamber being controlled by said piston, and valve means operating in synchronism with said piston for controlling the connection of the other of said passages with said mixture receiving chamber.

16. In an internal combustion engine, in combination, crank shaft enclosure means comprising a combustible mixture receiving chamber, a reciprocable piston, a crank shaft within said chamber, said piston being connected with said crank shaft and being adapted to control communication between said chamber and the explosion chamber of said engine, said receiving chamber and the explosion chamber having connection with one another through a by-pass controlled by said piston, a passage for supplying combustible mixture to said chamber for minimum engine running requirements, another passage for supplying combustible mixture to said chamber for higher speed running conditions, said second mentioned passage having means therein for varying the flow of mixture therethrough, the connection of said first-mentioned passage with said mixture receiving chamber being controlled by said piston, and valve means operating in synchronism with said piston for controlling the connection of the other of said passages with said mixture receiving chamber.

17. In an internal combustion engine, in combination, crank shaft enclosure means comprising a combustible mixture receiving chamber, a reciprocable piston, a crank shaft within said chamber, said piston being connected with said crank shaft and being adapted to control communication between said chamber and the explosion chamber of said engine, said receiving chamber and the explosion chamber having connection with one another through a by-pass controlled by said piston, a non-throttleable passage for supplying combustible mixture to said chamber for minimum engine running requirements, another passage for supplying combustible mixture to said chamber for higher speed running conditions, said second mentioned passage having means therein for varying the flow of mixture therethrough, and valve means operating in synchronism with said piston for controlling the connection of said passages with said mixture receiving chamber.

18. In an internal combustion engine, in combination, crank shaft enclosure means comprising a combustible mixture receiving chamber, a reciprocable piston, a crank shaft within said chamber, said piston being connected with said crank shaft and being adapted to control communication between said chamber and the explosion chamber of said engine, said receiving chamber and the explosion chamber having connection with one another through a by-pass controlled by said piston, a passage for supplying combustible mixture to said chamber for minimum engine running requirements, another passage for supplying combustible mixture to said chamber for higher speed running conditions, said second mentioned passage having means therein for varying the flow of mixture therethrough, the connection of said second-mentioned passage with said mixture receiving chamber being controlled by said piston, and valve means operating in synchronism with said piston for controlling the connection of said first-mentioned passage with said mixture receiving chamber.

19. In an internal combustion engine, in combination, a piston, a crank shaft, crank shaft enclosure means comprising a combustible mixture receiving chamber, a by-pass connecting said mixture receiving chamber with the explosion chamber of said engine, said by-pass being controlled by said piston, a mixture supplying conduit for supplying fuel for idling conditions and a second conduit for supplying mixture to said mixture receiving chamber, and means for varying the effective area of said second conduit, one of said conduits being connected to said mixture receiving chamber through a two-port system, the other of said conduits being connected to said mixture receiving chamber through a three-port system responsive to movement of said piston.

20. In an internal combustion engine, in combination, a piston, a crank shaft, crank shaft enclosure means comprising a combustible mixture receiving chamber, a by-pass connecting said mixture receiving chamber with the explosion chamber of said engine, said by-pass being controlled by said piston, a mixture supplying conduit and a second conduit for supplying mixture to said mixture receiving chamber, and means for varying the effective area of said second conduit, said first-mentioned mixture supplying conduit being connected to said mixture receiving chamber through a two-port system, said second conduit being connected to said mixture receiving chamber through a three-port system responsive to movement of said piston.

21. In an internal combustion engine, in combination, a piston, a crank shaft, crank shaft enclosure means comprising a combustible mixture receiving chamber, a by-pass connecting said mixture receiving chamber with the explosion chamber of said engine, said by-pass being controlled by said piston, a non-throttleable mixture supplying conduit and a second conduit for supplying mixture to said mixture receiving chamber, and means for varying the effective area of said second conduit, both of said conduits being connected to said mixture receiving chamber through a two-port system responsive to movement of said crank shaft, each of said conduits being provided with a fuel jet.

22. In an internal combustion engine, in combination, a piston, a crank shaft, crank shaft enclosure means comprising a combustible mixture receiving chamber, a by-pass connecting said mixture receiving chamber with the explosion chamber of said engine, said by-pass being controlled by said piston, a non-throttleable mixture supplying conduit and a second conduit for supplying mixture to said mixture receiving chamber, and means for varying the effective area of said second conduit, said first mentioned conduit being connected to said mixture receiving chamber through a three-port system responsive to movement of said piston, said second conduit being connected to said mixture receiving chamber through a two-port system.

23. In a two-cycle internal combustion engine having a crank case compression chamber and an explosion chamber, means forming a two-port fuel admission passage and a three-port combustible mixture admission passage to said crank case compression chamber, an individual fuel feed for each of said passages, and means for varying the flow of combustible mixture in one of said passages, the other of said passages being non-throttleable.

24. In a two-cycle internal combustion engine having a crank case compression chamber and an explosion chamber, means forming a three-port adjustable fuel admission passage and a two-port fixed fuel admission passage into said compression chamber, said passages having a common inlet and a single feeding jet for said two passages.

25. An internal combustion engine comprising, in combination, a plurality of cylinders, pistons within said cylinders, crank shaft enclosure means, means for dividing said enclosure means into a plurality of compartments corresponding to and communicating with said cylinders, means controlled by said pistons for providing communication between said compartments and the explosion ends of said cylinders, a crank shaft within said enclosure means, means providing a non-throttleable passageway for a combustible mixture for said cylinders for idling conditions, said pistons and said crank shaft forming an operative assembly, means responsive to operation of said assembly for controlling the connection of said idling speed passageway successively to said compartments, means providing a passageway to each of said cylinders for supplying combustible mixture to said cylinders for higher speed conditions, and control means for said last mentioned means.

26. An internal combustion engine comprising, in combination, a plurality of cylinders, pistons within said cylinders, crank shaft enclosure means, said enclosure means comprising a plurality of compression compartments corresponding to and communicating with said cylinders, means controlled by said pistons for providing communication between said compartments and the explosion ends of said cylinders, a crank shaft within said enclosure means, said crank shaft and said pistons forming an operative assembly, means providing a non-throttleable passageway for combustible mixture for said compartments for idling conditions, means responsive to operation of said assembly for controlling the connection of said idling passageway successively to said compartments, means providing a passageway to each of said compression compartments for supplying combustible mixture to said compartments for higher speed conditions, and control means for said last mentioned means.

CLARENCE L. JOHNSON.

CERTIFICATE OF CORRECTION.

Reissue No. 21,886. August 26, 1941.

CLARENCE L. JOHNSON.

It is hereby certified that error appears in the printed specification of the above numbered patent requiring correction as follows: Page 3, first column, line 34, for "fort" read --port--; and second column, line 26, claim 5, for the word "cylinder" read --cylinders--; and that the said Letters Patent should be read with this correction therein that the same may conform to the record of the case in the Patent Office.

Signed and sealed this 21st day of October, A. D. 1941.

Henry Van Arsdale,
Acting Commissioner of Patents.

(Seal)